United States Patent [19]
Thoman

[11] 3,835,879
[45] Sept. 17, 1974

[54] HOSE RACK ASSEMBLY
[75] Inventor: Charles J. Thoman, Wauseon, Ohio
[73] Assignee: Seco Manufacturing, Inc., Wauseon, Ohio
[22] Filed: Apr. 9, 1973
[21] Appl. No.: 349,076

[52] U.S. Cl. ......................................... 137/355.18
[51] Int. Cl. ............................................ B65h 75/46
[58] Field of Search..... 137/355.16, 355.17, 355.18, 137/355.19, 355.20, 355.21, 355.22, 355.23, 355.24, 355.25, 355.26, 355.27, 355.28

[56] References Cited
UNITED STATES PATENTS
| | | | |
|---|---|---|---|
| 1,658,793 | 2/1928 | Hansen | 137/355.18 |
| 2,719,752 | 10/1955 | Dodge, Jr. et al. | 137/355.18 |
| 2,756,101 | 7/1956 | Caufmann | 137/355.18 |
| 3,338,260 | 8/1967 | Thompson | 137/355.28 |
| 3,670,763 | 6/1972 | Magdars | 137/355.28 X |
| 3,736,952 | 6/1973 | Thompson | 137/355.28 |

*Primary Examiner*—Henry T. Klinksiek
*Attorney, Agent, or Firm*—Barnes, Kisselle, Raisch & Choate

[57] ABSTRACT

A Hose Rack Assembly for providing a water cut-off clamp at the root end of the hose to permit hose extension and remote release including a pivoted hose rack and a clamp at the proximal end of the rack for closing off the hose passage. Includes a pivoted hose clamp bar in conjunction with a clamp actuator adapted for manual clamping and hose tension release, the clamp bar being shiftable to adapt to varying thickness and types of hose.

9 Claims, 4 Drawing Figures

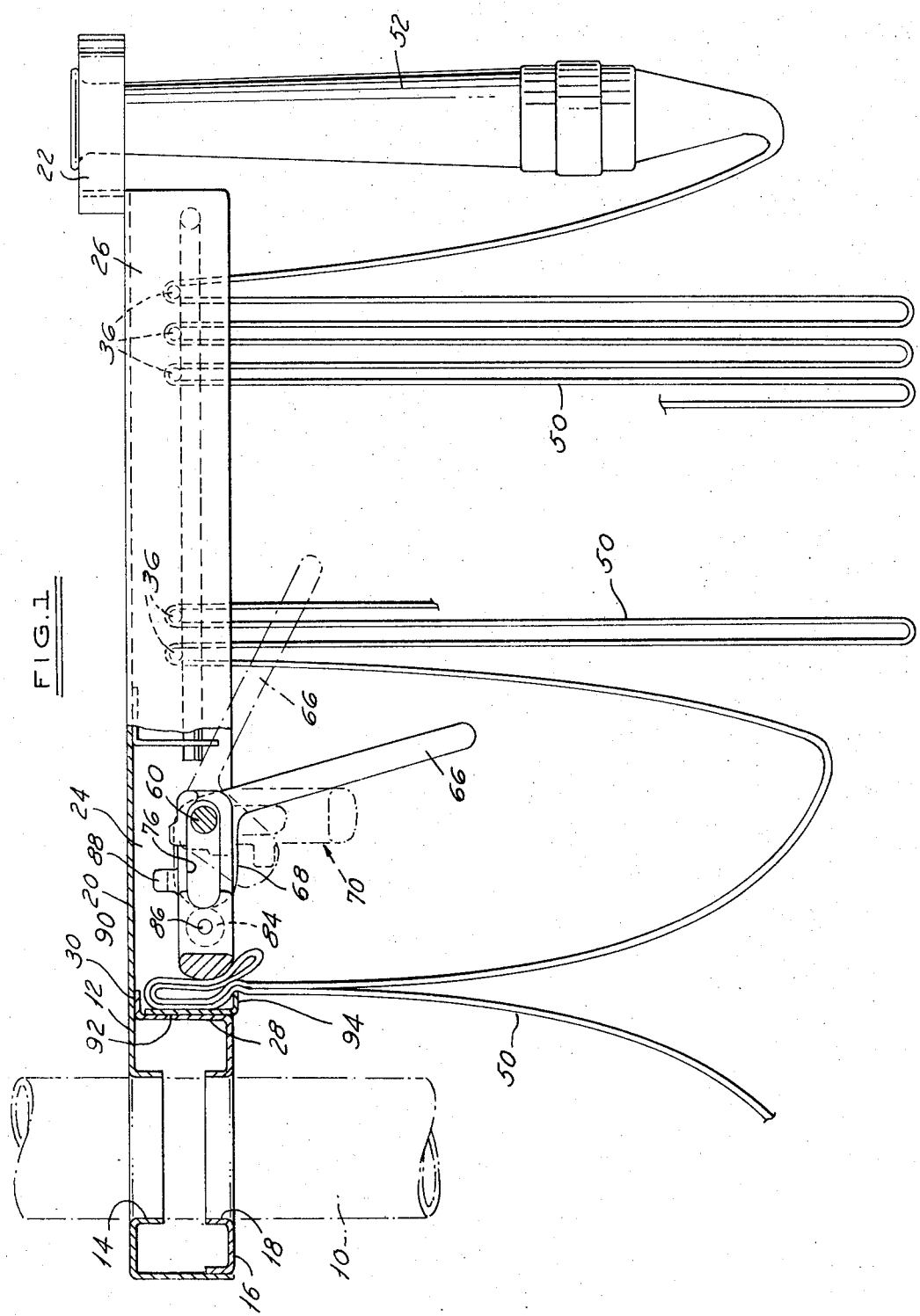

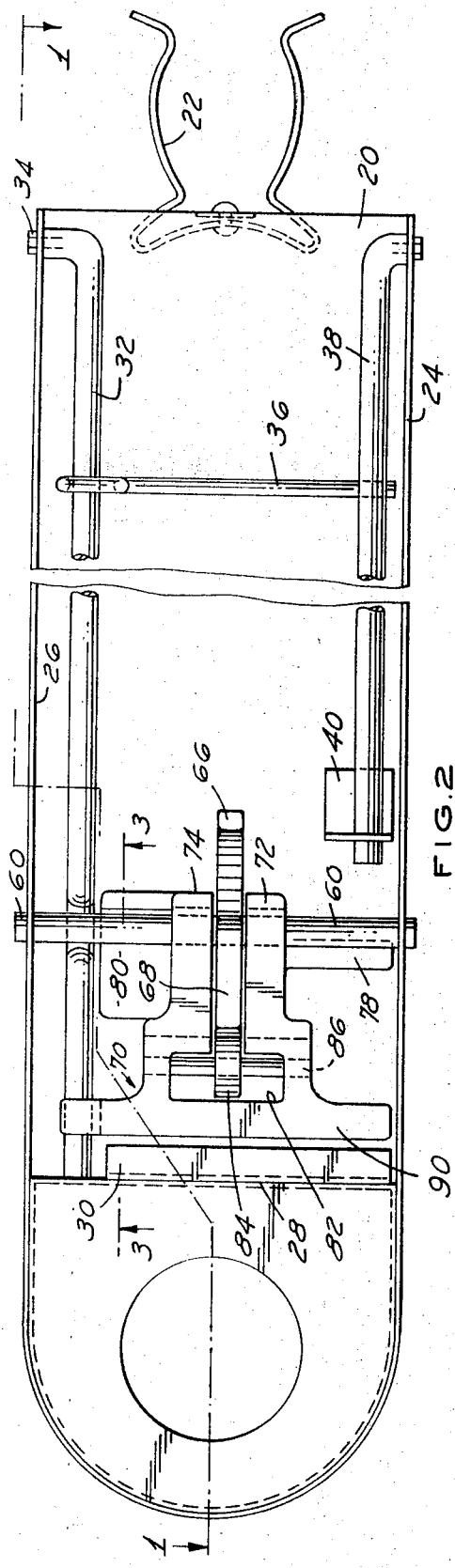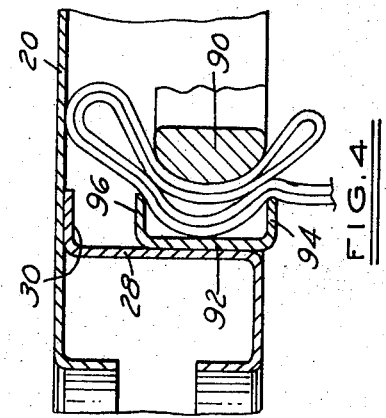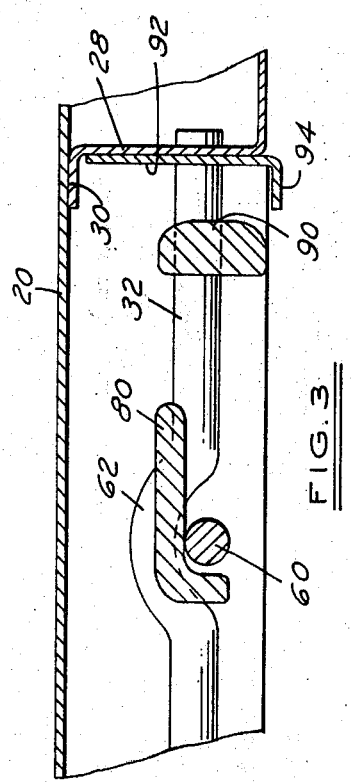

HOSE RACK ASSEMBLY

BACKGROUND OF THE INVENTION

Fire protection hose racks particularly adapted for the interior of buildings have been known and in use for many years. It is desirable that these racks have a clamp to close off the hose at the root end while it is being extended to the location of a fire even though the water has been turned on at the proper valve. When the nozzle end of the hose has been pulled to the fire area, the water can be passed through the hose by simply pulling the hose sharply to release its folds from a clamp. Examples of this general type of hose rack are found in the disclosures of U.S. Pat. Nos. 1,177,316 (1916) and 3,338,260 (1967).

It is an object of the present invention to provide an improved type of hose clamp which is simple in construction and yet adaptable to different types of fire hose without any adjustable parts which can be rendered functionless by improper handling.

It is a further object to provide a clamp construction which is relatively simple in operation such that it may be used without extensive instruction.

Other objects of the invention will be apparent in the following description and claims taken with the accompanying drawings in which there is disclosed the principles of operation of the invention and the best mode presently contemplated for the practice thereof.

Drawings accompany the disclosure and the various views thereof may be briefly described as:

FIG. 1, a side elevation partly in section (on line 1—1 of FIG. 2) illustrating the relationship of the parts.

FIG. 2, a bottom view of the assembly shown without the hose.

FIG. 3, a sectional view on line 3—3 of FIG. 2.

FIG. 4, a sectional view of a modified clamping bracket.

Referring to the drawings, in FIG. 1, a vertical support pipe 10 carries the hose rack frame which is composed of a top arm 12 having a flanged opening 14 and a hub section 16 having a flanged opening 18. The top arm 12 has a top plate 20 extending radially from the support a suitable distance depending on the amount of hose to be stored. At the end of the top plate is a nozzle clamp 22. The top plate is flanged downwardly at each side to provide sides 24 and 26. The hub section has chordal wall 28 which extends between the sides and has a flange 30 to underlie the top plate. These parts are joined together by suitable welds to form a support hub for the extender arm section.

A hose pin support rod 32 has one end supported in a hole in wall 28 (FIG. 3) to position the rod in spaced relation to the wall 26. The other end of the rod is bent normal to the rod to position against the wall 26, this end being held by a screw 34. The digital ends of hose support pins 36, having eyes threaded by the rod 32, can be slidably supported on the top side of a slide support rod 38 mounted adjacent the other side 24 on a bracket 40 at one inner end and a screw 42 at the outer end.

The hose 50 is looped over these hose pins and supported for storage as shown in FIG. 1. When the nozzle 52 is removed from its support and the hose tensioned, it will pull the digital end of pins 36 off the rod 38 allowing them to pivot about the rod 32 and releasing the loops of the hose seriatim.

The pressure close-off mechanism for the root or valve end of the hose is supported on a cross-rod 60 supported in pivotal relation between the arm sides 24–26. The rod 32 is formed with a bend 62 (FIG. 3) to provide clearance for the pivotal cross-rod. Mounted centrally of the cross-rod is an operating lever having a handle portion 66 on one side of the cross-rod and a lobe 68 on the other side. The handle is retained centrally of cross-rod either by a serrated portion onto which the lever is pressed or by a set screw.

A bifurcate clamping bar 70 (bottom view in FIG. 2) is also mounted on the cross-rod 60. This bar has rearwardly extending fingers 72, 74 lying on either side of the operating lever, these fingers having sufficient thickness that a slot 76 can be formed in each to receive the cross-rod (FIG. 1). A side extension spacer 78 extends at 90° to finger 72 while on the other side a spacer plate 80 overlies cross-rod 60 and extends to within a short distance of hose pin support rod 32. See sectional view in FIG. 3.

The slot between fingers 72, 74 widens into a cross-recess 82 and a roller 84 is mounted in this recess on a pin 86 parallel to pin 60, the roller being in line with lobe 68 of the operating lever. A cross-over bar 88 spans the two fingers spaced above the slot between the fingers to serve as a reinforcing element and also to facilitate lifting of the clamping bar by the lever lobe 68.

The forward operating edge 90 of the clamping bar has a rounded surface as illustrated in FIG. 3 and extends between side 24 of the support and the pin support bar 32, when in the up position, and facing but spaced from the chordal plate 28. Clearance cavities are provided at the end of the clamping bar nearest the bar 32 to allow the bar to move into proper position. On the outer face of the plate 28 is flanged pressure plate 92 with a flange 94 extending toward the clamping bar. In FIG. 4, a modified pressure plate is shown with a secondary flange 96 for certain types of hose.

The clamping bar 70 is loosely supported on the pivot rod 60 and may swing to a pendent position as shown in dotted lines in FIG. 1 when not in a clamping position. When the device is to be utilized, a fold of hose can be double folded and placed against a clamping bar in a position shown in FIG. 1 or FIG. 4. The clamping is then raised to press against the fold and clamp the fold against the flange 94. The handle 66 of the operating lever is then shifted to move the nose of the lobe 68 against the roller and slightly past the center of the roller. This locks the parts in place against the resilience of the folded hose.

It will readily be seen that when the water valve (not shown) which furnishes water to the hose is turned on, the water flow will stop at the clamped portion of the hose. However, when the hose is pulled off the rack and tension is finally placed on the last fold, this tension will transmit to the clamped area and cause dislodgment of the bar edge 90 releasing the clamping bar and allowing free flow of the water to the hose and nozzle. This permits the hose to be drawn out to the area of the fire before water flows from the nozzle. This also permits straightening out the hose before water flow which might otherwise cause the hose to writhe and tangle. The arrangement permits a single operator to control water release remotely. Of course, the handle 66 can always be manually shifted to a release position if desired.

The cross-bar 88 allows the lobe 68 of the lever to raise the clamping bar by manipulation of the handle 66 and the slot mount 76 allows the clamping bar to move back so it can position above the flange 94.

Thus, the two-piece unit absent any springs or adjustment screws or posts provides a secure clamp which is readily positioned for storage and readily released by hose tension. The cooperation of the nose or bar surface 90 with the flange 94 in FIG. 1 is significant. The parts are spaced so that the hose can be folded between the parts. A thicker hose such as cotton may have a single fold while a nylon hose may have a double fold. The lodging of the lobe 68 slightly above the roller 84 causes a reaction downward on bar 90 (FIG. -)so that there is a pressure on the folded hose. In FIG. 4, the flange 94 is coupled with a spaced flange 96 so that the bar 90 pushes the hose into the groove thus formed, the flanges being spaced slightly wider than the forward end of the bar 90. These relationships stabilize the bar until there is an intentional dislodgment by a tugging on the released hose.

I claim:

1. A clamp for a fire hose for use in a fire hose rack wherein a hose is supported in multiple loops for a rapid dispensing from the rack and a clamp is utilized for blocking water from the hose until the hose is intentionally released by tension from the rack which comprises:
   a. an elongate support having a proximal end adjacent a support and a distal end for carrying the hose,
   b. a clamping surface adjacent the proximal end of the hose support positioned to extend transversely of the hose when in flattened condition,
   c. a pivoted hose clamp bar supported for pivotal movement about an axis transverse of said hose rack and supported for movement in a longitudinal direction relative to said rack,
   d. means on said hose clamp bar for receiving clamping pressure in the direction of said clamping surface, and
   e. an actuator lever on said rack for applying pressure on said means to urge said hose clamp bar toward said clamping surface to lock one or more folds of a flattened hose between said surface and said hose clamp bar, said hose clamp bar comprising a body portion having a forward clamping surface and a supportive section on said body having a slot extending longitudinally of said hose rack, and supporting means on said hose rack for said clamp bar comprising a transverse pivot rod extending through said slot.

2. A clamp for a fire hose as defined in claim 1 in which the means on said clamp bar for receiving clamping pressure comprises a roller mounted to rotate on an axis transverse of said hose rack.

3. A clamp for a fire hose as defined in claim 2 in which the clamp actuator comprises a lever means pivoted on said transverse pivot rod having one arm for contacting said roller on one side of said rod, and a lever arm on the other side of said rod for actuating said one arm.

4. A clamp for a fire hose as defined in claim 1 in which the clamping surface comprises a base extending across said elongate support, and a flange along said base extending from said base in the direction of said distal end and said clamping bar and having a free edge positioned slightly below the bottom of said bar in clamping position.

5. A clamp for a fire hose as defined in claim 1 in which the clamping surface comprises a base extending across said elongate support, and spaced means extending along said base having projections extending in the direction of said distal end toward said clamping bar and positioned to lie parallel to and adjacent the lower and upper surfaces of said bar to form a receptacle to partially receive a fold of a fire hose when under pressure of said bar in clamping position.

6. A clamp as defined in claim 5 in which said spaced means are positioned respectively slightly above and slightly below said bar in clamping position.

7. A clamp for a fire hose for use in a fire hose rack wherein a hose is supported in multiple loops for a rapid dispensing from the rack and a clamp is utilized for blocking water from the hose until the hose is intentionally released by tension from the rack which comprises:
   a. an elongate support having a proximal end adjacent a support and a distal end for carrying the hose,
   b. a clamping surface adjacent the proximal end of the hose support positioned to extend transversely of the hose when in flattened condition,
   c. a pivoted hose clamp bar supported for pivotal movement about an axis transverse of said hose rack and supported for movement in a longitudinal direction relative to said rack,
   d means on said hose clamp for receiving clamping pressure in the direction of said clamping surface, and
   e. an actuator lever on said rack for applying pressure on said means to urge said hose clamp bar toward said clamping surface to lock one or more folds of a flattened hose between said surface and said hose clamp bar, said hose clamp bar comprising a body having a forward bar portion extending transversely of said elongate support provided with a contact surface facing toward said clamping surface and a rearward body portion extending from said forward portion toward the distal end of said support having a slot to pivotally mount said body on said rack and to permit motion of said bar toward said clamping surface, and means to locate said clamp bar transversely in said elongate support.

8. A clamp for a fire hose for use in a fire hose rack wherein a hose is supported in multiple loops for a rapid dispensing from the rack and a clamp is utilized for blocking water from the hose until the hose is intentionally released by tension from the rack which comprises:
   a. an elongate support having a proximal end adjacent a support and a distal end for carrying looped hose and formed of a member having sides spaced apart a distance slightly greater than the width of a flattened fire hose and means to support multiple loops of hose,
   b. means forming a stationary clamping surface adjacent the proximal end of the hose support positioned to extend transversely of the hose and having a relatively narrow contact surface facing the distal end of the support,
   c. a hose clamp bar movably mounted on said support having a relatively broad transverse surface to lie adjacent said contact surface in a clamping position,
d. means to mount said bar for pivotal movement on a first axis extending across said support from side to side and for sliding movement lengthwise of said support toward and away from said clamping surface,
e. means on said hose clamp bar facing toward the distal end of said support for receiving clamping pressure, and
f. an actuator lever pivoted on said support on an axis transverse of said support movable from a clamping position to a release position and having a first lever arm terminating in a pressure end to contact said means for receiving clamping pressure when in a clamping position, and having a second lever arm depending from said support when in clamping position, wherein a fold of a fire hose will loop under said second arm from said clamping surface in a manner to actuate said second lever arm to a release position when the hose is stripped from said support.

9. A clamp for a fire hose as defined in claim 8 in which said means to mount said bar comprises a slot formed longitudinally in said bar and a pivot pin on said first axis extending through said slot, the ends of the pin being mounted in the sides of the elongate hose support, said actuator lever being also mounted on said pivot pin.

* * * * *